Patented Aug. 14, 1934

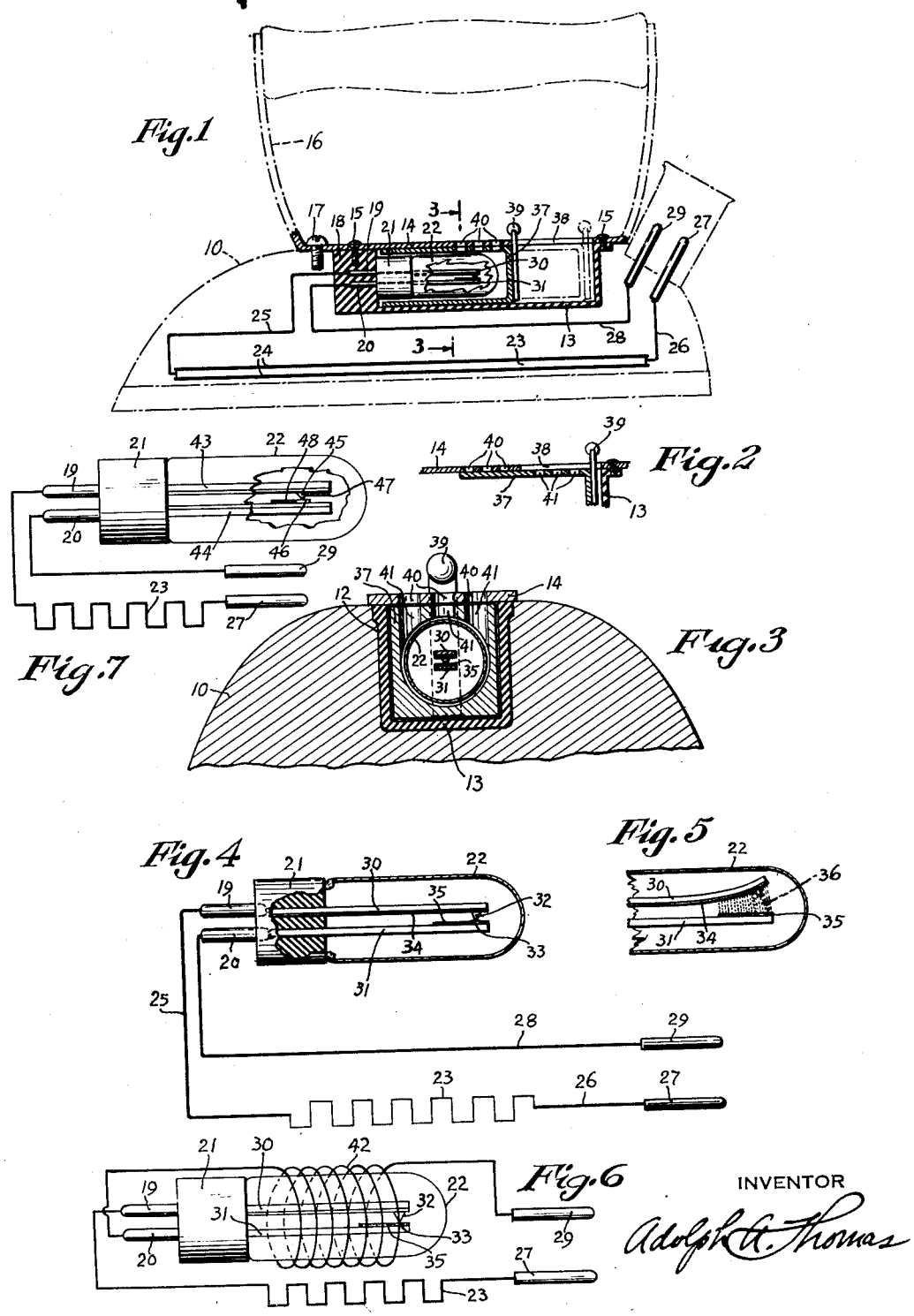

1,969,955

UNITED STATES PATENT OFFICE 1,969,955

CURRENT CONTROLLING APPARATUS

Adolph A. Thomas, New York, N. Y.

Application May 8, 1929, Serial No. 361,287
Renewed January 3, 1934

3 Claims. (Cl. 200—138)

This invention relates to electric appliances and its object is primarily to provide new and improved means for automatically regulating the temperature or other condition of an appliance within predetermined limits. As applied to an electric heating implement, the characteristic feature of my invention comprises a vacuum tube containing thermostatic and electronic means for controlling a heating circuit in accordance with the thermal condition of the implement. In its simplest form, this tube contains a pair of contact members, usually in the form of small bars or strips, which normally close an electric circuit. At least one of these members is of thermostatic structure, and the other member is adapted to emit a stream of electrons when heated to a certain degree. Thus, the thermostatic member is an anode and the electronic member a cathode. As the thermostatic anode gets hot, it moves (or tends to move) away from the cathode, until a temperature is reached where actual separation of the electrodes takes place. This however, does not interrupt the heating circuit and there is no arcing, because the cathode emits a stream of electrons which form a conducting path for the current. The resistance of this electronic path increases as the thermostatic member keeps moving away from the cathode under the action of increasing heat, until a moment arrives when the electrodes are so far separated that practically no current passes through the tube. The consequent cooling of the heating appliance causes the thermostatic member to return to the stationary electrode and again close the circuit for the passage of maximum heating circuit. In this way the slow movements of the thermostatic member cause an electronic path of variable conductivity to control the current in a work circuit. In electrical heating appliances embodying my controlling tube, I may also provde simple mechanical means for regulating the heating effect of the appliance on the thermostatic member.

The novel features and practical advantages of my invention will be understood from a description of the accompanying drawing, in which—

Fig. 1 shows one form of my new controlling device installed in an electric flat iron;

Fig. 2 is a fragmentary detail of a heat-regulating shield or shutter used in the flat iron of Fig. 1;

Fig. 3 represents an enlarged section on line 3—3 of Fig. 1;

Fig. 4 is a diagram of circuit connections;

Fig. 5 indicates diagrammatically an electron stream between the separated electrodes of the tube;

Fig. 6 shows in a diagrammatic way a modification in which the tube is surrounded by a heating coil; and Fig. 7 illustrates another embodiment of my invention in which both electrodes in the tube are adapted to emit electrons, so that the device works equally well on direct and alternating current.

The electric flat iron 10, which represents broadly any suitable current-consuming device, has a recess or chamber 12 in which an insulating shell or housing 13 is supported. This shell may be of bakelite or other molded composition material, and it may conveniently be attached to the top plate 14 of the iron by screws 15 or otherwise. The plate 14 may constitute a part of (or be attached to) the handle bracket 16, which is secured to the body of the iron by screws or bolts 17. The insulating shell 13 is formed at one end with a base or block 18 having contact holes for receiving a pair of pins 19 and 20 projecting from the base 21 of a small vacuum tube 22. The appliance 10 carries a heating element 23, which is usually a grid or flat coil of suitable metal (such as nichrome, for example) supported between a pair of insulating sheets 24 of mica or similar material. One end of the heating element 23 is connected by a conductor 25 to the contact pin 19 of lamp 22, and the other end of the heating element is connected by a conductor 26 to the plug terminal 27. A conductor 28 connects the other plug terminal 29 with the contact pin 20 of tube 22. It may be assumed that the ends of conductors 25 and 28 are connected to metallic thimbles, or the like, which line the openings into which the tube contacts 19 and 20 are inserted.

The vacuum tube 22 contains a pair of electrodes 30 and 31. In the present instance, the electrode 30 is a thermostat bar carrying at its free end a contact point 32 normally held in firm engagement with a contact button 33 on electrode 31. The latter is preferably a spring bar which normally presses against the contact point 32 to hold the heating circuit closed by a good metal contact. The thermostat bar 30 may be of usual bimetallic construction in which the inner strip 34 has the higher coefficient of expansion, so that the bar moves away from the electrode 31 at predetermined high temperature. The electrode 31 carries a coating 35 of electron-emitting material, such as the oxides of barium, calcium and strontium, which may be fixed in place by cement or in any other practical way. When the electrode 31 is at negative potential and sufficiently hot, the material 35 emits a stream of electrons, diagrammatically indicated at 36 in Fig. 5, against the thermostat bar 30, which is now at positive potential.

The heat-controlling action of the vacuum tube 22 will be apparent by considering Figs. 4 and 5. The circuit through the heating element 23 is normally closed by the switch contacts 32 and 33 of electrodes 30 and 31, which also operate as conductors for connecting the switch contacts to the base pins 19 and 20. The tube 22 being mounted or embedded in the metal body 10 is subjected to the heat produced therein by the resistance element 23. As this heat increases, there comes a time when the thermostat 30 begins to move away from the stationary electrode 31, so that the metal path of the current across contacts 32 and 33 is interrupted. This does not, however, break the heating circuit, because the current now passes across the electron path 36. There is therefore no arcing during the separation of contacts 32 and 33. As the heat if the thermostat bar 30 increases, it moves farther away from the electrode 31, whereby the electron stream 36 becomes attenuated and its resistance is correspondingly increased. This reduces the heating current passing through element 23 and the iron begins to cool, so that the thermostat bar 30 now moves back toward the fixed electrode 31. The result is an increase in the conductivity of the electron path 36, and the heat of the iron rises in a corresponding degree. In this way, the slow silent movements of the thermostatic electrode 30 vary the resistance (or conductivity) of the electron stream 36 to control the value of the heating current, whereby the prevailing temperature of the electric appliance 10 is kept within certain limits. This temperature need not vary more than fifteen or twenty degrees at the most; indeed, if the thermostat bar 30 is properly designed, this variation may be kept within ten degrees or so, which is practically a constant temperature for household heating appliance.

In some instances the thermostat bar 30 at extremely high temperature may move so far away from the cathode 31 that the electron stream 36 is broken or so increased in resistance that the heating circuit is actually interrupted. This will cause the iron to cool more quickly, but as soon as the thermostat bar 30 resumes its normal position, as shown in Fig. 4, the heating circuit is closed through a metallic path and the iron heats up rapidly until the condition illustrated in Fig. 5 again prevails. It is not necessary that the iron when in use shall cool sufficiently to enable the thermostat bar 30 to make metallic contact with the cathode 31, because the automatic regulation of the temperature is obtained by a variation in the conductivity of the electron path 36 as the free end of the thermostat bar approaches and recedes from the fixed electrode 31. The important feature about the operation of the tube 22 is the combined thermostatic and electronic regulation of the heating current without arcing. This eliminates one of the worst objections inherent in prior thermostat devices for controlling the temperature of electric heating appliances. Furthermore, in the use of my new controlling tube, the temperature of the heating appliance does not drop too much before the thermostat bar 30 moves back to (or toward) normal position for increasing the flow of heating current. This feature is of particular advantage in electric flat irons where a too-low heat makes ironing impossible. The last-named objection is one of the serious troubles experienced in flat irons provided with snap-action thermostats for breaking the circuit when the temperature goes too high. It has been found that such thermostats require a low temperature to snap back to circuit-closing position. This difficulty is entirely eliminated in any combined thermostatic and electronic control tube.

In one form of my invention, as shown in Figs. 1 and 2, I provide mechanical means for regulating the rate of heating of tube 22. The shell or housing 13 contains a heat-insulating shield or shutter 37 surrounding the tube 22 and mounted to slide in the shell. The plate 14 has a slot 38 through which projects a suitable handle or finger piece 39 attached to the slidable shield 37. Holes 40 in plate 14 are arranged to register with holes 41 in shield 37 when the latter is in the position shown in Fig. 1. In this position of shell 37, the tube 22 is open to the cool outer air, so that the rate of heating of the tube is decreased. This means that the thermostat bar 30 will remain in contact with the electrode 31 a correspondingly longer time and the temperature of the iron will be raised. When the handle 39 is pushed to the extreme right, as shown in Fig. 2 (and in dotted lines in Fig. 1), the tube 22 is entirely enclosed, so that the thermostat bar 30 heats more rapidly and thereby lowers the prevailing temperature of the iron. The top of the flat iron may be appropriately marked to indicate to the operator that the position of the finger piece 39 in Fig. 1 means maximum temperature, while the other extreme position of the finger piece means minimum temperature. Intermediate temperatures are obtained by adjusting the finger piece 39 to any position between its two extreme positions.

In Fig. 6 I have shown the heat-controlling tube 22 surrounded by a heating coil 42 connected in series with the electrodes 30—31 and with the heating element 23. The purpose of the heating coil 42 is to insure the heating of the thermostat bar 30 if the tube 22 is so placed that it does not get the full heating effect of the appliance 10. In fact, the use of the auxiliary heating coil 42 makes it possible to place the tube 22 in any convenient position, not only in the heating appliance itself, but at a distance therefrom. For instance, the tube 22 could be mounted in a small casing or box placed in a stationary position on a table or ironing board. The shell 13 with its controlling shield or shutter 37 may be constructed in the form of a separate box for the controlling tube 22.

In Figs. 4, 5 and 6 the thermostat bar 30 is the anode and the electrode 31 is the cathode, but it is manifest that the electronic material 35 may be mounted on the thermostat bar 30, so that the latter becomes the cathode and the electrode 31 the anode. In this construction it is assumed that the cathode is connected to the negative side of the heating circuit. Of course, where the heating element 23 is traversed by alternating current, the electrode 31 is at negative potential during one alternation of each wave. During the other alternation the current does not pass across the electron stream 36, but that does not interfere with the heat-controlling function of the electrodes. If the heating appliance 10 is to be used on direct current, it is necessary that the terminal 29, which leads to the cathode 31, shall be connected to the negative side of the circuit. However, since housewives and servants are not supposed to be able to distinguish between positive and negative terminals, I have provided a controlling tube equally well adapted for alternating and direct current circuits. A tube of that kind is illustrated in Fig. 7, which I shall now describe.

The vacuum tube 22 of Fig. 7 contains a pair of electrodes 43 and 44, at least one of which is a thermostat bar. In this instance I have represented both of these electrodes as thermostat bars adapted to move apart under the action of high heat, but it is sufficient if either of these electrodes is of thermostatic structure. These thermostat bars carry contacts 45 and 46, which are normally in firm pressure engagement to close the circuit through the heating element 23. The thermostat bar 43 has a coating of electron-emitting material 47, and the thermostat bar 44 has a similar electronic coating 48. The two coatings 47 and 48 are preferably arranged on opposite sides of the contacts 45 and 46, so that each coating faces a metallic conducting surface. When the electrode 43 is at negative potential, the coating 47 emits an electron stream to electrode 44. When the latter is at negative potential, the coating 48 emits an electron stream to the electrode 43. In this way the electronic conducting path between the electrodes 43 and 44 shifts alternately from coating 47 to coating 48, when the tube is connected in an alternating current circuit. In a direct current circuit, no attention need be paid to positive and negative terminals when the contact pins 27 and 29 are connected in circuit, because one or the other of the two electron coatings 47 and 48 is certain to be at negative potential. Otherwise, what has been said for the operation of Figs. 4 and 5 applies fully to Fig. 7. The advantage of the modification in Fig. 7 over the construction of Fig. 4 is that the former operates not only equally well on direct and alternating current, but also utilizes both half-waves in an alternating current circuit.

Although I have shown and described certain specific constructions, I want it understood that my invention is not limited to the details set forth. The basic principle of my invention is doubtless capable of other embodiments than those herein disclosed without departing from the scope of the invention as defined in the appended claims.

I claim as my invention:

1. A vacuum tube containing two switch contacts which normally are closed to provide a metallic conducting path, one of said contacts comprising a thermostat bar adapted to move out of engagement with the other contact at predetermined high temperature to break said metallic path, and an electron-emitting coating carried by at least one of said contacts to provide an electronic conducting path between the two contacts when they are mechanically separated, the conductivity of said electronic path decreasing as the separation of the contacts increases by the continued movement of said thermostat bar at increasing temperature.

2. A vacuum tube in which two thermostat bars are mounted and normally in metallic contact to form a closed switch, said thermostat bars being adapted to separate upon predetermined rise in temperature, and an electron-emitting coating carried by each thermostat bar, whereby each of said bars when at negative potential emits a stream of electrons to the other bar to provide an electronic conducting path between the separated bars, the conductivity of said electronic path decreasing as the separation of the thermostat bars increases at increasing temperature.

3. A vacuum tube containing normally closed switch contacts to provide a metallic conducting path, means whereby said contacts automatically separate at predetermined high temperature in the tube to break said metallic path, and electron-emitting means in said tube to provide an electronic conducting path between said contacts when they are mechanically separated, the conductivity of said electronic path decreasing as the separation of said contacts increases with increasing temperature.

ADOLPH A. THOMAS.